(12) United States Patent
Williams et al.

(10) Patent No.: US 7,523,159 B1
(45) Date of Patent: Apr. 21, 2009

(54) SYSTEMS, METHODS AND DEVICES FOR A TELEMATICS WEB SERVICES INTERFACE FEATURE

(75) Inventors: Wade Williams, San Diego, CA (US); Randy Yuen, San Diego, CA (US); Vern Badham, San Diego, CA (US)

(73) Assignee: HTI, IP, LLC, Atlanta, GA (US)

( * ) Notice: Subject to any disclaimer, the term of this patent is extended or adjusted under 35 U.S.C. 154(b) by 924 days.

(21) Appl. No.: 10/823,478

(22) Filed: Apr. 13, 2004

Related U.S. Application Data

(63) Continuation-in-part of application No. 10/626,810, filed on Jul. 24, 2003, which is a continuation of application No. 09/808,690, filed on Mar. 14, 2001, now Pat. No. 6,611,740.

(51) Int. Cl.
*G06F 15/13* (2006.01)
(52) U.S. Cl. ............... 709/203; 709/219; 709/222; 709/226; 709/250; 701/29; 701/213
(58) Field of Classification Search ........... 709/203, 709/219, 222, 226, 250; 701/29, 213
See application file for complete search history.

(56) References Cited

U.S. PATENT DOCUMENTS

| | | | |
|---|---|---|---|
| 3,748,894 | A | 7/1973 | White et al. |
| 4,258,421 | A | 3/1981 | Juhasz et al. |
| 4,602,127 | A | 7/1986 | Neely et al. |
| 4,690,475 | A | 9/1987 | McElroy |
| 4,694,408 | A | 9/1987 | Zaleski |
| 4,926,330 | A | 5/1990 | Abe et al. |
| 4,956,777 | A | 9/1990 | Cearley et al. |
| 5,003,317 | A | 3/1991 | Gray et al. |
| 5,026,293 | A | 6/1991 | Wilson |
| 5,050,080 | A | 9/1991 | Abe |
| 5,157,610 | A | 10/1992 | Asano et al. |
| 5,223,844 | A | 6/1993 | Mansell et al. |
| 5,289,378 | A | 2/1994 | Miller et al. |

(Continued)

FOREIGN PATENT DOCUMENTS

CA  2133673  10/1994

(Continued)

OTHER PUBLICATIONS

U.S. Appl. No. 10/440,596, filed May 19, 2003, Lang et al.

(Continued)

*Primary Examiner*—Jinsong Hu

(57) ABSTRACT

A telematics system is disclosed that includes a web services interface in communication with a secondary software system, wherein the web services interface comprises at least one processor configured to retrieve, receive, analyze and/or transmit data in response to a request from the secondary software system. In addition, the telematics system includes a gateway system configured to transmit data through a network to an in-vehicle telematics device and receive data from the in-vehicle telematics device, wherein the data comprises diagnostic data and/or location-based data associated with a host vehicle. The telematics system also includes a database in communication with the gateway system and the web services interface, wherein the database is configured to receive and store data transmitted from the gateway system and/or the web services interface.

10 Claims, 8 Drawing Sheets

U.S. PATENT DOCUMENTS

| | | |
|---|---|---|
| 5,343,906 A | 9/1994 | Tibbals, III |
| 5,442,553 A | 8/1995 | Parrillo |
| 5,450,321 A | 9/1995 | Crane |
| 5,463,567 A | 10/1995 | Boen et al. |
| 5,473,540 A | 12/1995 | Schmitz |
| 5,479,479 A | 12/1995 | Braitberg et al. |
| 5,491,486 A | 2/1996 | Welles et al. |
| 5,532,927 A | 7/1996 | Pink et al. |
| 5,537,336 A | 7/1996 | Joyce |
| 5,550,551 A | 8/1996 | Alesio |
| 5,574,427 A | 11/1996 | Cavallaro |
| 5,671,141 A | 9/1997 | Smith et al. |
| 5,673,305 A | 9/1997 | Ross |
| 5,680,328 A | 10/1997 | Skorupski et al. |
| 5,732,074 A | 3/1998 | Spaur et al. |
| 5,737,215 A | 4/1998 | Schricker et al. |
| 5,754,965 A | 5/1998 | Hagenbuch |
| 5,758,300 A | 5/1998 | Abe |
| 5,774,828 A | 6/1998 | Brunts et al. |
| 5,781,101 A | 7/1998 | Stephen et al. |
| 5,781,871 A | 7/1998 | Mezger et al. |
| 5,797,134 A | 8/1998 | McMillan et al. |
| 5,798,647 A | 8/1998 | Martin et al. |
| 5,808,907 A | 9/1998 | Shetty et al. |
| 5,828,585 A | 10/1998 | Welk et al. |
| 5,850,209 A | 12/1998 | Lemke et al. |
| 5,884,202 A | 3/1999 | Arjomand |
| 5,928,292 A | 7/1999 | Miller et al. |
| 5,941,918 A | 8/1999 | Blosser |
| 5,964,821 A | 10/1999 | Brunts et al. |
| 6,020,654 A | 2/2000 | Chutorash |
| 6,064,970 A | 5/2000 | McMillan et al. |
| 6,104,988 A | 8/2000 | Klarer |
| 6,141,611 A | 10/2000 | Mackey et al. |
| 6,154,658 A | 11/2000 | Caci |
| 6,167,426 A | 12/2000 | Payne et al. |
| 6,225,898 B1 | 5/2001 | Kamiya et al. |
| 6,236,933 B1 | 5/2001 | Lang |
| 6,240,295 B1 | 5/2001 | Kennedy et al. |
| 6,240,365 B1 | 5/2001 | Bunn |
| 6,263,268 B1 | 7/2001 | Nathanson |
| 6,285,953 B1 | 9/2001 | Harrison et al. |
| 6,295,492 B1 | 9/2001 | Lang et al. |
| 6,338,152 B1 | 1/2002 | Fera et al. |
| 6,339,736 B1 * | 1/2002 | Moskowitz et al. ............ 701/29 |
| 6,339,745 B1 | 1/2002 | Novik |
| 6,354,868 B1 | 3/2002 | Korczynski et al. |
| 6,356,205 B1 | 3/2002 | Salvo et al. |
| 6,356,823 B1 | 3/2002 | Iannotti et al. |
| 6,400,701 B2 | 6/2002 | Lin et al. |
| 6,408,232 B1 | 6/2002 | Cannon et al. |
| 6,429,773 B1 | 8/2002 | Schuyler |
| 6,442,460 B1 | 8/2002 | Larson et al. |
| 6,459,988 B1 | 10/2002 | Fan et al. |
| 6,487,479 B1 | 11/2002 | Nelson |
| 6,487,494 B2 | 11/2002 | Odinak et al. |
| 6,487,717 B1 | 11/2002 | Brunemann et al. |
| 6,496,777 B2 | 12/2002 | Tennison et al. |
| 6,502,030 B2 | 12/2002 | Hilleary |
| 6,505,106 B1 | 1/2003 | Lawrence et al. |
| 6,507,786 B2 | 1/2003 | Flick |
| 6,522,267 B2 | 2/2003 | Flick |
| 6,526,335 B1 | 2/2003 | Treyz et al. |
| 6,526,460 B1 | 2/2003 | Dauner et al. |
| 6,529,159 B1 * | 3/2003 | Fan et al. ............... 342/357.09 |
| 6,552,682 B1 | 4/2003 | Fan |
| 6,556,889 B2 | 4/2003 | Rudick et al. |
| 6,556,905 B1 | 4/2003 | Mittelsteadt et al. |
| 6,564,127 B1 | 5/2003 | Bauerle et al. |
| 6,580,916 B1 | 6/2003 | Weisshaar et al. |
| 6,594,576 B2 | 7/2003 | Fan et al. |
| 6,594,579 B1 | 7/2003 | Lowrey et al. |
| 6,604,032 B1 | 8/2003 | Moller |
| 6,604,033 B1 | 8/2003 | Banet et al. |
| 6,604,038 B1 | 8/2003 | Lesesky et al. |
| 6,609,051 B2 | 8/2003 | Fiechter et al. |
| 6,611,686 B1 | 8/2003 | Smith et al. |
| 6,611,739 B1 | 8/2003 | Harvey et al. |
| 6,611,740 B2 | 8/2003 | Lowrey et al. |
| 6,611,755 B1 | 8/2003 | Coffee et al. |
| 6,636,790 B1 | 10/2003 | Lightner et al. |
| 6,664,922 B1 | 12/2003 | Fan |
| 6,675,081 B2 | 1/2004 | Shuman et al. |
| 6,678,614 B2 * | 1/2004 | McCarthy et al. ............ 701/213 |
| 6,687,587 B2 | 2/2004 | Kacel |
| 6,694,234 B2 | 2/2004 | Lockwood et al. |
| 6,718,425 B1 | 4/2004 | Pajakowski et al. |
| 6,732,031 B1 | 5/2004 | Lightner et al. |
| 6,732,032 B1 | 5/2004 | Banet et al. |
| 6,751,452 B1 | 6/2004 | Kupczyk et al. |
| 6,751,479 B1 | 6/2004 | Knight |
| 6,754,485 B1 | 6/2004 | Obradovich et al. |
| 6,757,262 B1 | 6/2004 | Weisshaar et al. |
| 6,795,017 B1 | 9/2004 | Puranik et al. |
| 6,801,841 B2 | 10/2004 | Tabe |
| 6,832,140 B2 | 12/2004 | Fan et al. |
| 6,836,708 B2 | 12/2004 | Tripathi |
| 6,845,362 B2 | 1/2005 | Furuta et al. |
| 6,862,524 B1 | 3/2005 | Nagda et al. |
| 6,867,733 B2 | 3/2005 | Sandhu et al. |
| 6,882,313 B1 | 4/2005 | Fan et al. |
| 6,889,064 B2 | 5/2005 | Baratono et al. |
| 6,892,131 B2 | 5/2005 | Coffee et al. |
| 6,895,444 B1 * | 5/2005 | Weisshaar et al. ............ 709/250 |
| 6,922,566 B2 | 7/2005 | Puranik et al. |
| 6,947,760 B2 | 9/2005 | Weisshaar et al. |
| 6,947,816 B2 | 9/2005 | Chen |
| 6,973,324 B2 | 12/2005 | Weisshaar et al. |
| 7,016,774 B2 | 3/2006 | Barber et al. |
| 7,034,710 B2 | 4/2006 | Falada et al. |
| 2001/0016789 A1 | 8/2001 | Staiger |
| 2001/0033225 A1 | 10/2001 | Razavi et al. |
| 2001/0034609 A1 | 10/2001 | Dovolis |
| 2002/0008644 A1 | 1/2002 | Flick |
| 2002/0008645 A1 | 1/2002 | Flick et al. |
| 2002/0016655 A1 | 2/2002 | Joao |
| 2002/0029101 A1 | 3/2002 | Larson et al. |
| 2002/0032505 A1 | 3/2002 | Good |
| 2002/0065698 A1 | 5/2002 | Schick et al. |
| 2002/0073170 A1 | 6/2002 | Hoffman et al. |
| 2002/0078458 A1 | 6/2002 | Furon et al. |
| 2002/0118222 A1 | 8/2002 | Fogarty |
| 2002/0133273 A1 | 9/2002 | Lowrey et al. |
| 2002/0140545 A1 | 10/2002 | Nietupski et al. |
| 2002/0143446 A1 | 10/2002 | Rogers et al. |
| 2002/0150050 A1 | 10/2002 | Nathanson |
| 2002/0171650 A1 | 11/2002 | Prabhakaran |
| 2002/0173889 A1 | 11/2002 | Odinak et al. |
| 2002/0177476 A1 | 11/2002 | Chou |
| 2003/0004623 A1 | 1/2003 | Namaky et al. |
| 2003/0004624 A1 | 1/2003 | Wilson et al. |
| 2003/0009270 A1 | 1/2003 | Breed |
| 2003/0078722 A1 | 4/2003 | Odinak et al. |
| 2003/0083809 A1 | 5/2003 | Hatano |
| 2003/0093204 A1 | 5/2003 | Adachi et al. |
| 2003/0130005 A1 | 7/2003 | Weisshaar et al. |
| 2003/0130774 A1 | 7/2003 | Tripathi et al. |
| 2003/0139179 A1 | 7/2003 | Fuchs et al. |
| 2003/0147534 A1 | 8/2003 | Ablay et al. |
| 2003/0182055 A1 | 9/2003 | Curatolo et al. |
| 2003/0231118 A1 | 12/2003 | Kitson |
| 2003/0236596 A1 | 12/2003 | Eisenmann et al. |
| 2004/0023645 A1 | 2/2004 | Olsen et al. |
| 2004/0039502 A1 | 2/2004 | Wilson et al. |

| | | | |
|---|---|---|---|
| 2004/0044454 | A1 | 3/2004 | Ross et al. |
| 2004/0075539 | A1 | 4/2004 | Savoie et al. |
| 2004/0104842 | A1 | 6/2004 | Drury et al. |
| 2004/0196182 | A1 | 10/2004 | Unnold |
| 2005/0131729 | A1 | 6/2005 | Melby et al. |
| 2005/0144318 | A1 | 6/2005 | Chang |
| 2007/0069947 | A1 | 3/2007 | Banet et al. |

FOREIGN PATENT DOCUMENTS

| | | |
|---|---|---|
| CA | 2372900 A1 | 5/2003 |
| EP | 0816820 A2 | 1/1998 |
| WO | WO 00/40038 | 7/2000 |
| WO | WO 00/79727 | 12/2000 |

OTHER PUBLICATIONS

Frank Di Genova, Thomas C. Austin, S. Kingsley Macomber (Sierra Research, Inc.). Incorporation of Wireless Communications into Vehicle On-Board Diagnostic (OBD) Systems. Report No. SR00-01-03 prepared for California Air Resources Board. Jan. 18, 2000.

40 CFR 51, Ch. I (Jul. 1, 2001 Edition), pp. 130-481.

40 CFR 85, Ch. I (Jul. 1, 2001 Edition), 143 pages.

"I$^2$C," printed from http://www.nxp.com, Internet site, (associated with www.philipslogic.com), website accessed on Jun. 8, 2006, 3 pages.

"Qualcomm Chipset Solutions," printed from http://www.qualcomm.com, Internet site, website accessed on Jun. 8, 2006, 48 pages.

U.S. Appl. No. 11/654,213, filed Jan. 17, 2007.
U.S. Appl. No. 11/784,053, filed Apr. 5, 2007.
U.S. Appl. No. 11/788,930, filed Apr. 23, 2007.
U.S. Appl. No. 11/796,372, filed Apr. 27, 2007.
U.S. Appl. No. 11/799,848, filed May 3, 2007.

RD-422061 A; Anonymous; Jun. 10, 1999; Abstract, Using Internet for vehicle diagnostics-enabling using to operate vehicle personal computer to direct web browser to vehicle diagnostics website . . . .

Bary W. Wilson et al., Modular system for multiparameter in-line machine fluid analysis (Technology showcase Apr. 3-6, 2000).

40 CFR 85, Ch. I (Jul. 1, 2001 Edition), pp. 502-640.

Motorola, Inc., "Automotive ISO 9141 Serial Link Driver," 1996, p. 1-12.

D. John Oliver, Intel Corporation, "Implementing the J 1850 Protocol".

U.S. Appl. No. 09/776,033, filed Feb. 1, 2001, Banet et al.
U.S. Appl. No. 09/776,083, filed Feb. 1, 2001, Banet et al.
U.S. Appl. No. 09/776,106, filed Feb. 1, 2001, Lightner et al.
U.S. Appl. No. 09/804,888, filed Mar. 13, 2001, Lowrey et al.
U.S. Appl. No. 09/808,690, filed Mar. 14, 2001, Lowrey et al.
U.S. Appl. No. 09/908,440, filed Jul. 18, 2001, Lightner et al.
U.S. Appl. No. 09/922,954, filed Aug. 6, 2001, Lowrey et al.
U.S. Appl. No. 10/301,010, filed Nov. 21, 2002, Lightner et al.
U.S. Appl. No. 10/431,947, filed May 8, 2003, Hunt et al.
U.S. Appl. No. 10/447,713, filed May 29, 2003, Lightner et al.
U.S. Appl. No. 10/456,246, filed Jun. 6, 2003, Lowrey et al.
U.S. Appl. No. 10/456,788, filed Jun. 6, 2003, Banet et al.
U.S. Appl. No. 10/614,665, filed Jul. 7, 2003, Lowrey et al.
U.S. Appl. No. 10/615,516, filed Jul. 8, 2003, Lightner et al.
U.S. Appl. No. 10/625,942, filed Jul. 24, 2003, Banet et al.
U.S. Appl. No. 10/626,779, filed Jul. 24, 2003, Lightner et al.
U.S. Appl. No. 10/626,810, filed Jul. 24, 2003, Lowrey et al.
U.S. Appl. No. 10/632,033, filed Jul. 31, 2003, Banet et al.
U.S. Appl. No. 10/810,373, filed Mar. 26, 2004, Lowrey et al.
U.S. Appl. No. 10/831,952, filed Apr. 26, 2004, Hunt et al.
U.S. Appl. No. 10/841,724, filed May 7, 2004, Lightner et al.

Definition of "Chipset", Wikipedia. http://en.wikipedia.org/wiki/Chipset. Feb. 23, 2006.

* cited by examiner

Fig. 8

Found 12 service record(s). Click the Invoice Date or Work Order

| Invoice Date ▼ | Work Order # | Company |
|---|---|---|
| 11/10/03 | 209729 | Honda of El Cerrito Service |
| 08/22/03 | 202481 | Honda of El Cerrito Service |
| 08/21/03 | 199724 | Honda of El Cerrito Service |
| 03/15/03 | 189065 | Honda of El Cerrito Service |
| 02/03/03 | 185346 | Honda of El Cerrito Service |
| 11/05/02 | 177232 | Honda of El Cerrito Service |
| 09/08/02 | 171184 | Honda of El Cerrito Service |
| 07/09/02 | 165170 | Honda of El Cerrito Service |
| 06/17/02 | 161760 | Honda of El Cerrito Service |
| 04/30/02 | 158293 | Honda of El Cerrito Service |
| 03/28/02 | 155340 | Honda of El Cerrito Service |
| 03/22/02 | 154370 | Honda of El Cerrito Service |

Service Record

Work Order ID: 209729
Invoice Date: 11/09/03
Service Advisor Name & Number: PAUL FORTE (19)
Mileage: 38143
Repair Cost: 388.07

Job Information

| Job Pay Type | Operation | | | Technician ID |
|---|---|---|---|---|
| 1 | Customer | 01HOZ-37500 - 37500 MILE SERVICE | | 33 |
| | Comments: CUSTOMER REQUESTS 37,500 MILE SERVICE ESTIMATE INCLUDES HAZARDOUS WASTE CHARGE; RECOMMENDED MAINTENANCE - PERFORMED 37,500 MILE SERVICE | | | |
| 2 | Customer | 30HOZ-FRZPDRTR - FRONT PADS/ROTORS | | 33 |
| | Comments: NEEDS FRONT BRAKES, DUE TO NORMAL WEAR; REPLACED FRONT BRAKE PADS AND RESURFACED BOTH FRONT ROTORS | | | |

SYSTEMS, METHODS AND DEVICES FOR A TELEMATICS WEB SERVICES INTERFACE FEATURE

This application is a continuation-in-part of prior application Ser. No. 10/626,810, filed Jul. 24, 2003, which is a continuation of prior application Ser. No. 09/808,690, filed Mar. 14, 2001, now U.S. Pat. No. 6,611,740 the contents of each prior application incorporated herein by reference.

BACKGROUND

Vehicles, such as light-duty cars and trucks and heavy-duty tractor/trailers, may include "telematics" systems that monitor information describing the vehicle's location and diagnostic condition. Such telematics systems may include a conventional global positioning system ("GPS") that receives signals from orbiting satellites and a processor that analyzes these signals to calculate a GPS "fix." The fix describes the vehicle's location with an accuracy of about 10 meters or better and may include data such as the vehicle's latitude, longitude, altitude, heading, and velocity.

Telematics systems may also include circuitry that monitors the host vehicle's diagnostic system. For example, light-duty automobiles and trucks beginning with model year 1996 may include an on-board diagnostic ("OBD-II") system as mandated by the Environmental Protection Agency ("EPA"). OBD-II systems may operate under one of the following communication protocols: J1850 VPW (Ford); J1850 VPWM (General Motors); ISO 9141-2 (most Japanese and European vehicles); Keyword 2000 (some Mercedes and Hyundai vehicles); and CAN (a newer protocol used by many vehicles manufactured after 2004).

OBD-II systems monitor the vehicle's electrical, mechanical and emissions systems and generate data such as vehicle speed ("VSS"), engine speed ("RPM"), engine load ("LOAD"), and mass air flow ("MAF"). This data may be processed by a vehicle's engine control unit ("ECU") to detect malfunctions or deterioration in vehicle performance. In processing such data, the ECU may generate diagnostic trouble codes ("DTCs"), which are 5-digit codes (e.g., "P0001") indicating electrical or mechanical problems with the vehicle. Most vehicles manufactured after 1996 make the information available through a standardized, serial 16-cavity connector located in the vehicle and referred to herein as an "OBD-II connector." The OBD-II connector provides a serial interface to the vehicle's ECU and passes data and diagnostic codes to diagnostic equipment located external to the vehicle.

Likewise, heavy-duty trucks may also include a diagnostic system referred to herein as a "truck diagnostic system," which is analogous to the OBD-II systems present in light-duty vehicles. Truck diagnostic systems may operate under a communication protocol such as J1708/J1587 or J1939 and may include a connector located in the truck's interior and referred to herein as the "truck diagnostic connector." The truck diagnostic connector, like the OBD-II connector, makes the diagnostic information available to diagnostic equipment located external to the vehicle.

SUMMARY

An aspect of the present invention is to provide a telematics system that monitors a vehicle's diagnostic and location-based data and utilizes a web services interface to send the data to a secondary software application. According to various embodiments, an in-vehicle telematics device may transmit the diagnostic and location-based data from the vehicle to a database for storage. According to further embodiments, the web services interface may be in communication with the database, and when instructed by the secondary software application, the web services interface may extract the diagnostic and location-based data from the database. In addition, the web services interface may also format the data into a simple object access protocol (SOAP) message and transmit the message to the secondary software application. As a result, a user of the secondary software application, who is remotely located from the vehicle, may view the diagnostic and location-based data and make informed decisions regarding the status and location of the vehicle.

In one embodiment, the present invention is directed to a telematics system. The telematics system includes a web services interface in communication with a secondary software system, wherein the web services interface comprises at least one processor, wherein the processor is configured to retrieve, receive, analyze and/or transmit data in response to a request from the secondary software system. In addition, the telematics system includes a gateway software system configured to transmit data through a network to an in-vehicle telematics device and receive data from the in-vehicle telematics device, wherein the data comprises diagnostic data and/or location-based data associated with a host vehicle. The telematics system also includes a database in communication with the gateway software system and the web services interface, wherein the database is configured to receive and store data transmitted from the gateway software system and/or the web services interface.

In another embodiment, the present invention is directed to a telematics system that includes a gateway software system configured to receive diagnostic data and/or location-based data associated with a host vehicle. In this embodiment the diagnostic and location-based data are transmitted from an in-vehicle telematics device. In addition, the telematics system includes a web services interface configured to transmit data to a secondary software system and/or the in-vehicle telematics device and receive data from the secondary software system and/or the in-vehicle telematics device. The telematics system also includes a database, in communication with the gateway software system and the web services interface, configured to receive and store the diagnostic data and/or the location-based data. The diagnostic and location-based data are transmitted from the gateway software system and/or the web services interface.

In another embodiment, the present invention is directed to a method of monitoring and communicating diagnostic data and/or location-based data concerning a host. The method includes transmitting data to an in-vehicle telematics device and/or receiving diagnostic data and/or location-based data from the in-vehicle telematics device. The method also includes receiving a first message from a secondary software system; processing the first message; storing data in a database; retrieving data from the database; processing data; processing a web services description language file; and transmitting a second message to the secondary software system.

In another embodiment, the present invention is directed to an apparatus. The apparatus includes means for transmitting data to an in-vehicle telematics device and/or receiving diagnostic data and/or location-based data from the in-vehicle telematics device. The apparatus also includes means for receiving a first message from a secondary software system; means for processing the first message; means for storing data in a database; means for retrieving data from the database; means for processing data; means for processing a web services description language file; and means for transmitting a second message to the secondary software system.

In another embodiment, the present invention is directed to a computer-readable medium. According to this embodiment, the computer readable medium has stored thereon instructions which, when executed by a processor, cause the processor to transmit data to an in-vehicle telematics device and/or receive diagnostic data and/or location-based data from the in-vehicle telematics device. Instructions stored on the computer-readable medium may also cause the processor to receive a first message from a secondary software system; process the first message; store data in a database; retrieve data from the database; process data; process a web services description language file; and transmit a second message to the secondary software system.

BRIEF DESCRIPTION OF DRAWINGS

Further advantages of the present invention may be understood by referring to the following descriptions taken in conjunction with the accompanying drawings, in which:

FIG. 8 is a schematic drawing of an Internet-accessible web page displaying service records according to one embodiment of the present invention.

DETAILED DESCRIPTION

It is to be understood that the figures and descriptions of the present invention have been simplified to illustrate elements that are relevant for a clear understanding of the present invention, while eliminating, for purposes of clarity, other elements of a conventional telematics system. For example, certain telematics systems may include multiple power supplies that are not described herein. Those of ordinary skill in the art will recognize, however, that these and other elements may be desirable in a typical telematics system. However, because such elements are well known in the art and because they do not facilitate a better understanding of the present invention, a discussion of such elements is not provided herein.

Also, in the claims appended hereto, any element expressed as a means for performing a specified function is to encompass any way of performing that function including, for example, a combination of elements that perform that function. Furthermore the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

The term data is used herein generally to refer to any numbers, letters, symbols and/or analog quantities that function as an input to a device and/or an output from a device. The term "communication" is used herein generally to refer to any wireless and/or wireline transmission and/or reception of data including, but not limited to, voice, text and video data. Furthermore, the terms "send," "transmit" and "receive," or any conjugations thereof, are used herein generally to refer to all data communications over landline and/or wireless technologies including, but not limited to, point-to-point transfers and packet-switched networking. In addition, the term "user" is used herein generally to refer to a person and/or apparatus that operates, interfaces and/or communicates with a device or system such as, for example, a person operating a software system or a person interfacing with an Internet accessible website.

Figure 1:
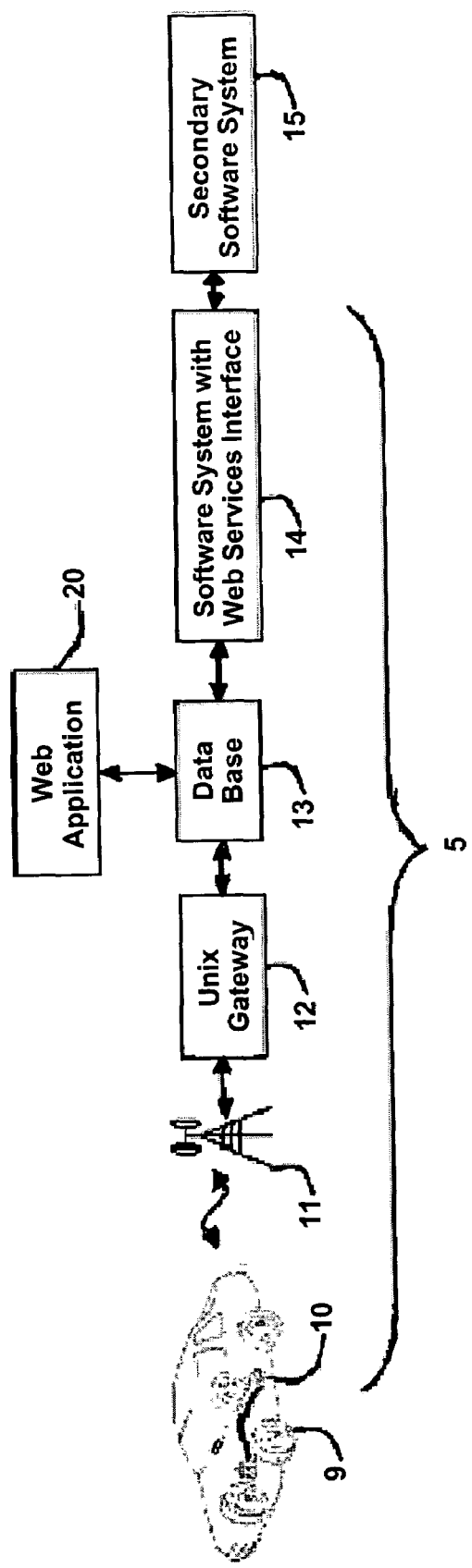
FIG. 1 is a schematic drawing of a telematics system featuring a web services interface according to one embodiment of the present invention.

FIG. 1 shows a telematics system 5, according to one embodiment of the present invention, that utilizes a web services interface 14 to monitor and analyze diagnostic and location-based data describing a vehicle 9. The web services interface 14 may cause the vehicle 9 to be in communication with a secondary software system 15, thereby enabling a user of the secondary software system 15 that is remotely located from the vehicle to view the diagnostic and location-based data and make informed decisions regarding the status and location of the vehicle.

In one embodiment, the telematics system 5 may include: (1) a telematic device 10 located in the vehicle 9; (2) a gateway software system 12 configured to receive the diagnostic and location-based data wirelessly transmitted from the telematics device 10; (3) a database 13 configured to receive the diagnostic and location-based data from the gateway software system 12 and store this data or derivatives thereof; and (4) a web services interface 14 configured to retrieve the diagnostic and location-based data or derivatives thereof from the database 13 in response to a request from the secondary software system 15.

According to one embodiment, an OBD-II connector (not shown) may supply power and ground to the telematics device 10. Additionally, the OBD-II connector may provide a serial interface between the telematics device 10 and the vehicle's engine computer (not shown), thus enabling the telematics system 5 to collect diagnostic data regarding the vehicle 9. In another embodiment, the telematics device 10 may also include an internal GPS system configured to receive signals from overlying satellites and convert the signals into location-based data such as latitude, longitude, altitude, speed, and heading.

In yet another embodiment, the telematics device 9 may also transmit and/or receive diagnostic and location-based data through a wireless network 11. The wireless network 11 connects to a gateway software system 12, e.g. a Unix gateway system. The wireless network 11 may involve a conventional circuit, or packet-switched network, e.g. CDMA networks (e.g., networks operated by Sprint and Verizon), GSM/GPRS networks (e.g., networks operated by ATT and Cingular), data-only networks (e.g., Mobitex and DataTac) and/or satellite networks. According to this embodiment, the gateway software system 12 may process the diagnostic and location-based data and store the data in the database 13. Furthermore, the secondary software system 15 may also utilize the web services interface 14 to access the diagnostic and location-based data stored in the database 13.

In one embodiment, the web services interface 14 may be based on Extensible Markup Language ("XML"), a computer language that encloses data in "documents" that are portable between software applications. According to this embodiment, XML may be utilized as a system-independent language for representing data transmitted across the web services interface 14. This transmission of data may be in the form of simple object access protocol ("SOAP") messages, which are XML-based messages that are communicated through standard Internet protocols such as, for example, Hypertext Transfer Protocol ("HTTP").

In another embodiment, the web services interface 14 may communicate with the secondary software system 15, wherein the secondary software system 15 may be an end-user application such as, for example, a web site and/or a software system capable of providing web services. According to this embodiment, the secondary software system 15 may process the diagnostic and location-based data by itself or combine and process these data with other information, which may be stored directly on the secondary software system 15 or may be accessed by the secondary software system 15 using the web services interface 14.

In one embodiment, the web services may be implemented with software, such as BEA WebLogic Server. According to this embodiment, the software may contain a software application, called a "servlet module," which sends and/or receives XML-based SOAP messages to and/or from the secondary software system 15. According to this embodiment, the servlet module may implement remote procedure calls ("RPCs") between the web services interface 14 and the secondary software system 15. In one embodiment, a user of the secondary software system 15 may utilize a keyboard, mouse or other input device to instruct the secondary software system 15 to poll data from the database 13 using the web services interface 14. In other embodiments, the secondary software system 15 may receive an automated HTTP request to initiate the data polling.

In another embodiment, the secondary software system 15 may interpret XML messages transmitted by the web services interface 14. According to this embodiment, the XML messages may be used to code web pages by enclosing data in "tags" that define the enclosed information. XML messgages may also be extensible, meaning a user may develop application-specific tags to disclose a wide range of data. In addition, with XML, the user may create a "schema" that describes the structure of the XML document, such as the definitions and locations of the tags used therein.

According to one embodiment of the present invention, the web services interface 14 may send diagnostic and location-based data formatted in a SOAP message from the database 13 to the secondary software system 15. In this embodiment, the web services interface 14 may "pull" (e.g., extract) the data from the database 13 in response to a query from the secondary software system 15 rather than "push" data to the secondary software system 15. In addition, the data may be formatted independent from the secondary software system 15 query or any other query that may result from any "downstream" processing.

In one embodiment, the secondary software system 15 may be designed on a software platform that supports web services, such as the Java 2 Platform, Enterprise Edition (J2EE™) or Microsoft's Net platform. The secondary software system 15 that may be built on J2EE™, may connect to other software applications through web services and include essential features such as security, distributed transaction management, and connection pool management. In other embodiments, data may be displayed using a conventional web application 20 that does not utilize a web service.

In one embodiment, the data transfer executed by the web services interface 14 may operate independently from the secondary software system 15, the data format of the secondary software system 15 or any processing performed by the secondary software system 15. Therefore, according to this embodiment, the telematics system 5 may function as a "data provider" to numerous secondary software systems 15, wherein each secondary software system 15 may be configured to execute different functions. For example, a vehicle-leasing company may employ a secondary software system 15 that utilizes the diagnostic and location data in combination with other data to perform a leasing transaction, such as authorizing a leased vehicle in need of repair. Using a web site that relies on the web services interface 14, a user at the vehicle-leasing company may access a web page that displays the vehicle's diagnostic data, previous service records, and a description of the type of repair that may be required. With this information, combined with data describing the vehicle's location, owner, and leasing program, the user may authorize the repair.

In another embodiment, the telematics system 5 may transmit the vehicle's location-based data through the web services interface 14 to a web-based secondary software system 15 operated by a call center that recovers stolen vehicles. According to this embodiment, a customer, whose vehicle was stolen, may call an operator located at a call center that has access to the web-based software system. Using the web services interface 14, the web-based secondary software system 15 retrieves the vehicle's most recent GPS-determined locations from the database 13. Armed with this information, the call center operator may then contact the local police to recover the stolen vehicle.

Alternatively, the telematics system 5 may transmit data and/or instructions from the secondary software system 15 to the in-vehicle telematics device 10 via the web services interface 14. The in-vehicle telematics device 10 may then display the data, or process and execute the instructions to perform a function. Such functions may include opening the vehicle's doors, sending diagnostic and/or location data, changing an update rate in which these data are transmitted, or downloading new firmware into the in-vehicle telematics device 10. In other embodiments, the data and/or instructions transmitted from the secondary software system 15 to the in-vehicle telematics device 10, or the data and/or instructions transmitted from the in-vehicle telematics device 10 to the secondary software system 15, may be used alone or in combination with other data to perform a given function.

In yet another embodiment, the telematics system 5 may provide wireless, real-time transmission and analysis of diagnostic and location-based data by one or more peripheral devices in communication with the in-vehicle telematics device 10. According to this embodiment, the telematics system 5 may characterize the vehicle's performance and determine the vehicle's location in real-time from any remote location that is in communication with a network, such as, for example, the Internet. In addition, the diagnostic and location information are complementary and, when analyzed together, may improve conventional services such as roadside assistance, vehicle theft notification and recovery, and remote diagnostics analysis. For example, the information may, according to one embodiment, indicate a vehicle's location, the vehicle's fuel level and battery voltage, and whether or not the vehicle 9 has any active diagnostic trouble codes ("DTCs"). Using such information, a call center, for example, may dispatch a tow truck equipped with the appropriate materials to properly service the vehicle 9 such as, for example, extra gasoline or tools required to repair a specific problem.

In another embodiment, one or more secondary software systems 15 are in communication with the web services software interface 14. The secondary software systems 15 may communicate simultaneously or sequentially with the web services software interface.

Further embodiments of the present invention may also be used in servicing a wide range of vehicles. In one embodiment, the telematics system 5 may, for example, cause the secondary software system 15 and/or the Web application 20 to be in communication with vehicles 9, including but not limited to: (1) automobiles, (2) commercial equipment, (3) light, medium and heavy-duty trucks, (4) construction vehicles such as, for example, front-end loaders, bulldozers and forklifts, (5) powered sport vehicles such as, for example, motorboats, motorcycles, all-terrain vehicles, snowmobiles and jet skis, (6) collision repair vehicles, (7) marine vehicles, and (8) recreational vehicles. Further, embodiments may also be useful in the vehicle care industry.

Figure 2:
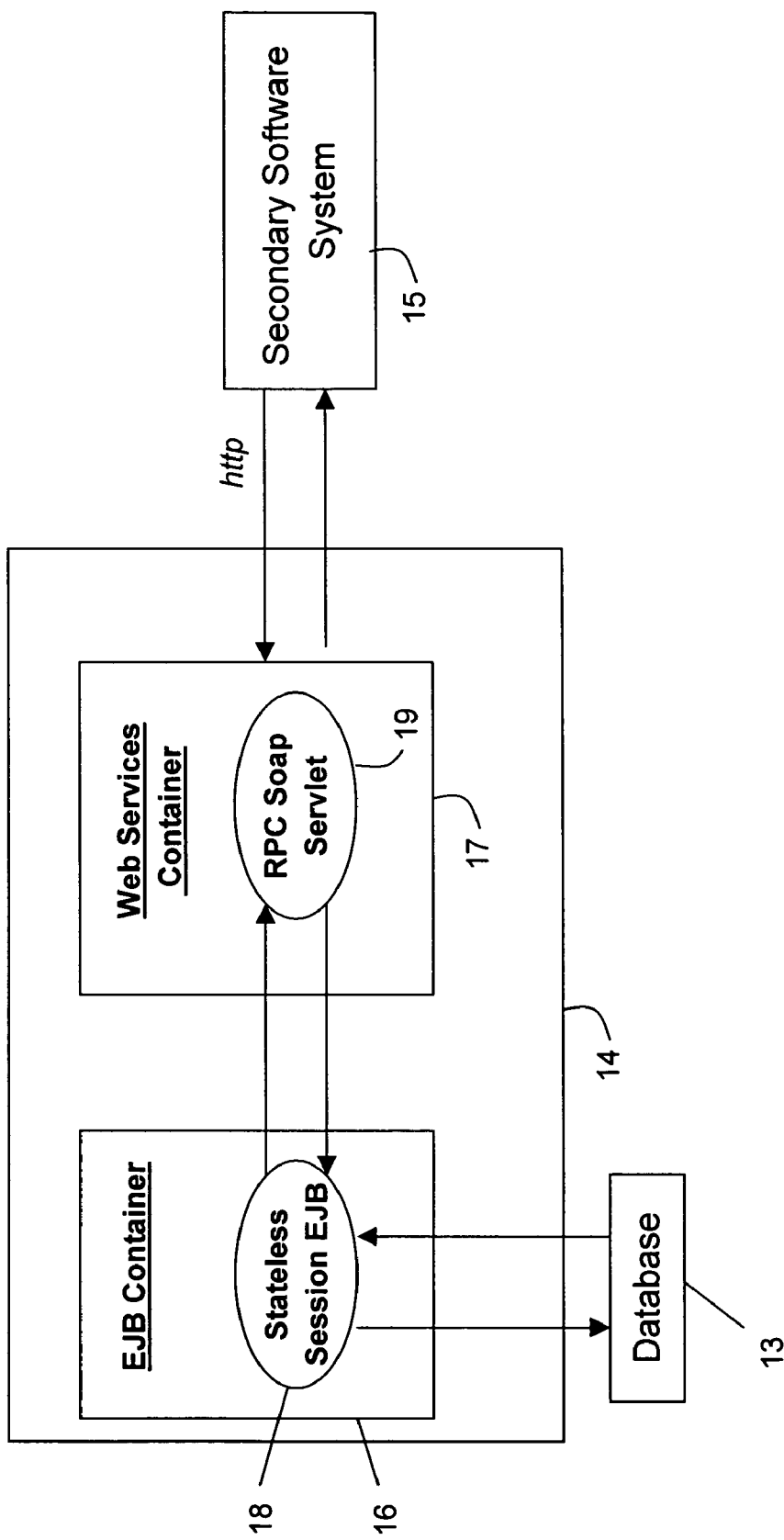
FIG. 2 is a schematic drawing of the web services interface of FIG. 1 according to one embodiment of the present invention.

Now referring to FIG. 2, the illustrated embodiments depict a telematics system 5 involving the web services interface 14 in communication with the secondary software system 15. In one embodiment, the web services interface 14 may comprise one or more processors having stored thereon instructions which, when executed by the processor, cause the processor to communicate with the secondary software system 15 and the database 13. According to this embodiment, the instructions may include a web services container 17 that may be a software application written, for example, in Java, and developed on a platform such as BEA WebLogic. The web services container 17 may execute an RPC SOAP servlet module 19 that communicates over HTTP with the secondary software system 15. In another embodiment, the instructions, which are stored on the web services interface processor, may also include an enterprise java bean (EJB) container 16. The EJB container 16 may be a software application configured to execute one or more stateless session enterprise java beans (EJB) 18 that communicate with the RPC SOAP servlet module 19. According to this embodiment, the servlet module 19 functions as a remote object that performs a well-defined function concerning the secondary software system 15.

In one embodiment, the RPC SOAP servlet module 19 in the web services interface 14 may be configured to process messages coded in an application-independent format such as an XML and/or SOAP format. According to this embodiment, the RPC SOAP servlet module 19 may include computer code that instructs the web services interface 14 to receive a SOAP message sent from the secondary software system 15, process the SOAP message, and extract at least one parameter from the message. In addition, the extracted parameter(s) may be transmitted to the stateless session EJB 18, wherein the stateless session EJB 18 is configured to transmit information to the database 13 and extract information from the database 13.

In other embodiments, the stateless session EJB 18 may include computer code that instructs the web services interface 14 to process a web services description language (WSDL) file and send at least one parameter of the WSDL file to the RPC SOAP servlet module 19. According to this embodiment, the WSDL file may be an XML document that specifies the location (e.g., web address) of the web service and the operations that the web service conducts. In still other embodiments, the web services interface 14 may further include computer code that sends the diagnostic and location-based data in the form of an XML or SOAP message to the secondary software system 15. In further embodiments, the web services interface 14 may include a software interface configured to receive information such as service records from the secondary software system 15. In these embodiments, the secondary software system 15 may, for example, be a data-management software (DMS) system and/or an enterprise resource planning (ERP) software system.

According to yet another embodiment of the present invention, the secondary software system 15 may instruct a web service to transmit parameter values in the form of a SOAP message to the web services container 17, which in turn may instruct the RPC SOAP servlet module 19 to return data to the secondary software system 15 in the form of a second SOAP message.

Figure 3:
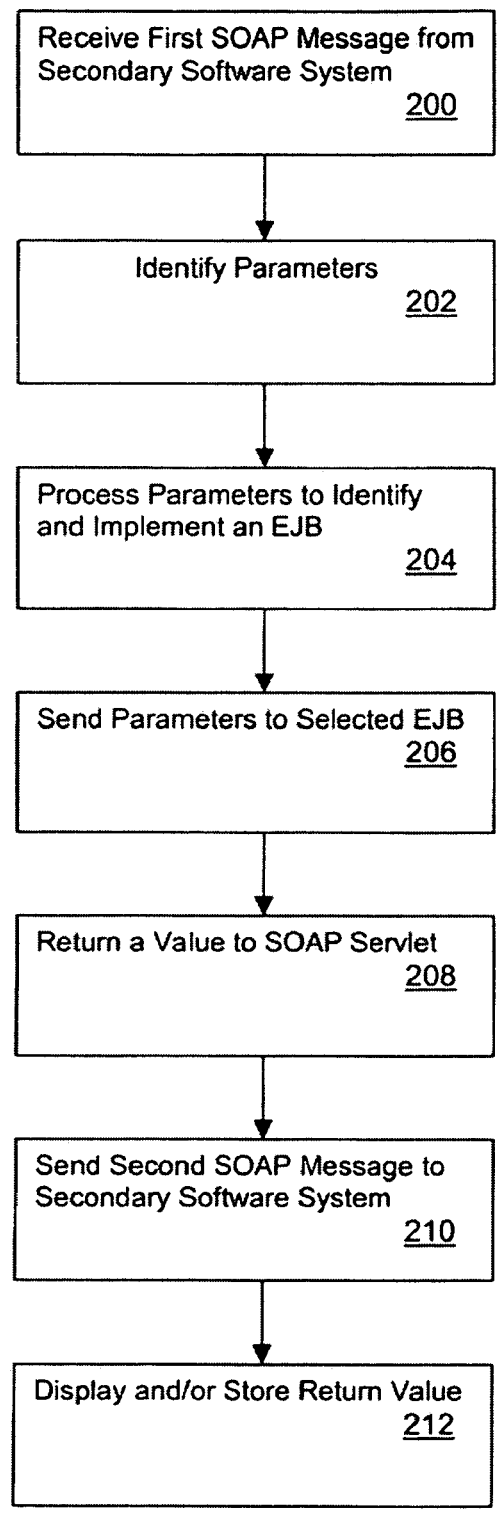
FIG. 3 is a flowchart illustrating a process performed by the telematics system according to one embodiment of the present invention.

FIG. 3 is a flowchart illustrating an embodiment of a process performed by the telematics system according to the present invention, wherein the web services container may include multiple SOAP servlet modules that are configured to manage different requests formatted in SOAP messages. According to this embodiment, one or more SOAP servlet modules may, at step 200, receive a first SOAP message from the secondary software system and, at step 202, "unwrap" the message to identify parameters contained within the message. At step 204, the SOAP servlet modules may process the parameters to identify and implement the stateless session EJB within the EJB container. The process may then proceed to step 206 where the SOAP servlet modules may send the parameters to the selected stateless session EJB. In response, the stateless session EJB may process the parameters and return a value to the SOAP servlet module at step 208, thereby triggering step 210 where the SOAP servlet module generates and sends to the secondary software system a second SOAP message that includes the return value. The process may then proceed to step 212 where the secondary software system displays the return value using a web site, for example, and/or stores the return value into a database located within the secondary software system.

Figure 4:
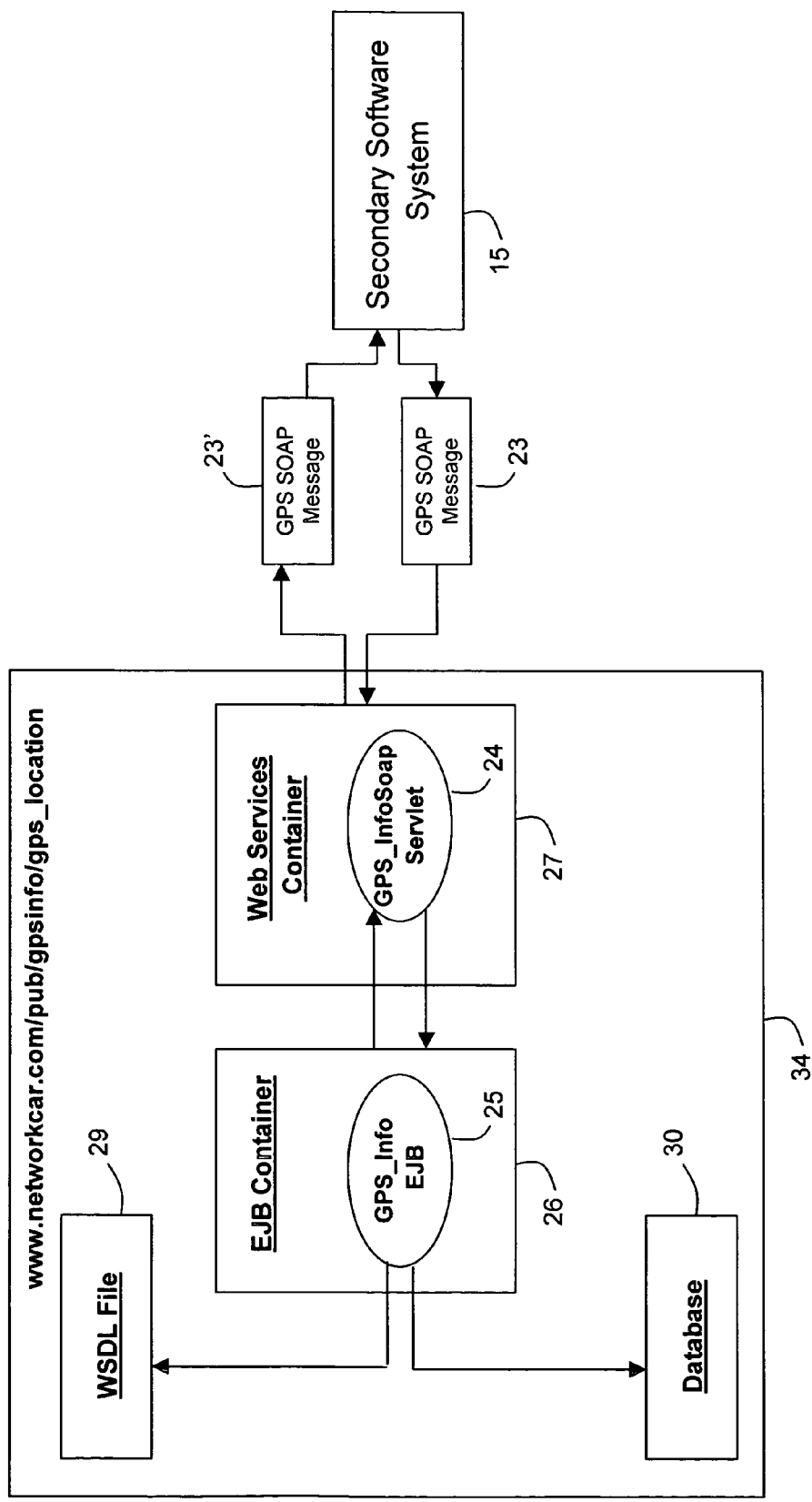
FIG. 4 is a schematic drawing of a telematics system featuring a web services interface according to one embodiment of the present invention.

FIG. 4 depicts an embodiment wherein the secondary software system 15 performs a "GPS_Info web service." In this embodiment the secondary software system 15 requests GPS information, such as a vehicle's latitude and longitude from a software system 34. In one embodiment, the software system 34 may be a component of a larger software system such as a telematics system. In addition, the software system 34 may be identified by a web address such as—"www.networkcar.com/pub/gpsinfo/gps_location." According to this embodiment, the software system 34 may include a web services container 27 and an EJB container 26, similar to those described above with reference to FIG. 2. During operation, the web services container 27 may receive a request in the form of a first GPS SOAP message 23 from the secondary software system 15. In response, the web services container 27 may instruct a GPS_Info SOAP servlet module 24 to unwrap the first GPS SOAP message 23 and extract parameters. In one embodiment, these parameters may identify that a GPS_Info EJB 25 needs to be implemented.

In another embodiment, the GPS_Info web service may be defined by a web services description language (WSDL) file 29, which is dynamically served through the GPS_Info EJB 25. According to this embodiment, the WSDL file 29 may be an XML document that specifies the location (e.g., web address) of the web service and the operations that the web service conducts, for example, a web service for retrieving location-based data.

In one embodiment of the present invention, the GPS_Info SOAP servlet module 24 may instruct the GPS_Info EJB 25 to execute a task and provide the GPS_Info EJB 25 with the necessary information to carry out the task. This information may include: an identification of the in-vehicle telematics device hat measures the GPS-determined location; the VIN of the vehicle that hosts the in-vehicle telematics device; and the name, username, and password of the customer associated with the vehicle. According to this embodiment, the GPS_Info EJB 25 may query a database 30 to authorize the request by ensuring that the requesting user has a valid username and password. In another embodiment, the GPS_Info EJB 25 may query the database 30 to generate a response "string" in the form of an XML document that includes either the requested GPS data or an "error statement" indicating that the GPS data is not available. In addition, the GPS_Info EJB 25 may return the XML document as a "payload" to the SOAP servlet module 24, wherein the SOAP servlet module 24 is configured to return the payload information to the secondary software system 15 in the form of a second SOAP message 23'.

According to one embodiment, the secondary software system 15 may complete the web service by receiving and processing the second SOAP message 23'. According to this embodiment, the secondary software system 15 may parse the XML payload within the second SOAP message 23' and incorporate the location-based data therein into an application such as a web site that features a mapping application; however, if the XML payload includes an error statement then the web site may then render an error message.

FIG. 5A-FIG. 8 illustrate Internet-accessible web pages, according to several embodiments of the present invention, wherein the Internet-accessible web pages are supported by the secondary software system. In these embodiments, the secondary software system may utilize the web services interface as described above, and may also display, receive and transmit data in more detail below.

Figure 5A:
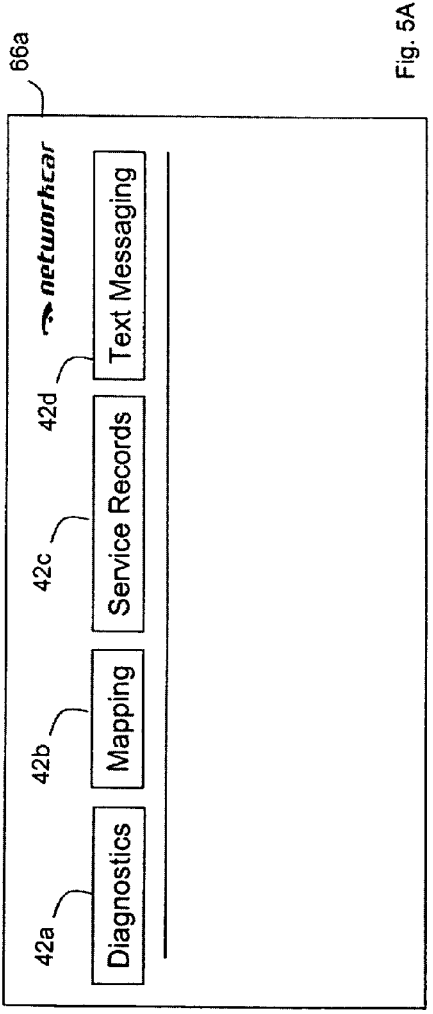
FIG. 5A is a schematic drawing of an Internet-accessible web site according to one embodiment of the present invention.

FIG. 5A illustrates an Internet-accessible web page 66a according to one embodiment of the present invention. According to this embodiment, the web page 66a may enable a fleet manager, for example, to view GPS and diagnostic information and text messages for each vehicle in the fleet. The web page 66a may be also connected to a text messaging-processing component configured to process information received from a host vehicle, comprising a telematics device and a peripheral device such as an LCD/keyboard.

In other embodiments, the web page 66a may feature tabs 42a-d that are capable of connecting to secondary web pages that display vehicle diagnostic information (42a), GPS information and mapping (42b), service records (42c) and text messaging (42d). Each of these web pages 42a-d is described below with reference to FIG. 5B-FIG. 8.

Figure 5B:
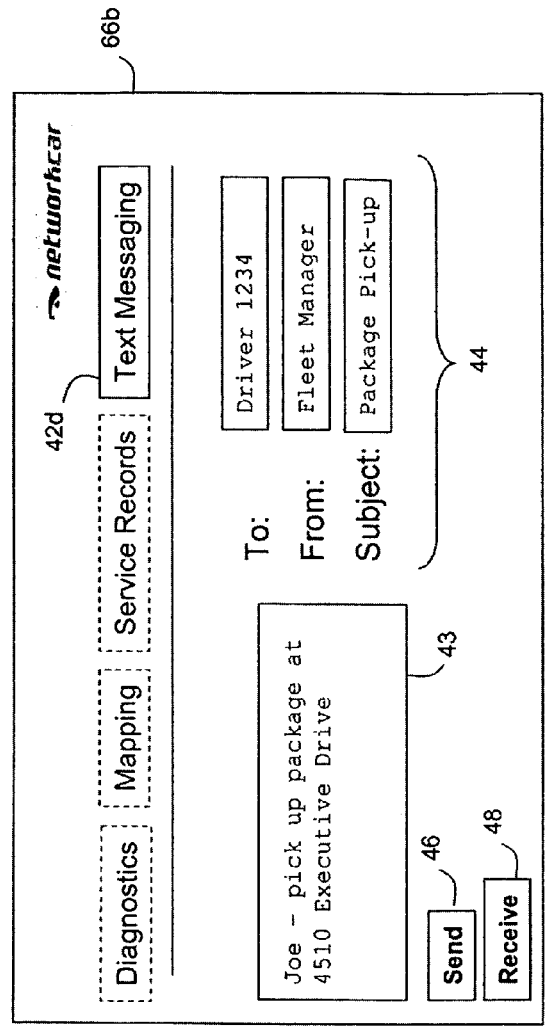
FIG. 5B is a schematic drawing of an Internet-accessible web page according to one embodiment of the present invention.

FIG. 5B is a block diagram of a web page 66b according to one embodiment of the present invention. The web page 66b may be rendered when a user selects the tab 42d labeled "Text Messaging" in the website 66a shown in FIG. 5A. The web page 66b may include a window 43 wherein a user (for example, a fleet manager) may type a text message that is sent through a wireless network and displayed on an LCD attached to the in-vehicle telematics device. The web page 66b may also include a field 44 that lists standard components of the text message such as the destination of the text message, the sender, and the subject of the message. In one embodiment, a fleet manager may type a message in the window 43 and wirelessly transmit the message to the driver of the host vehicle 9 by selecting the "Send" button 46. Similarly, the fleet manager may receive incoming text messages in the window 43 by clicking the "Receive" button 48. According to various embodiments of the present invention, the text messages may be sent to and received from the in-vehicle telematics device using the web services interface as described above.

In another embodiment, the web page 66b may include text messaging software that enables the web page 66b to communicate with additional web pages that include software systems for managing text messages. According to this embodiment, these software systems may include file-management systems for storing and managing incoming and outgoing messages; systems for sending messages to multiple vehicles in the fleet; systems for tracking the status of a message; systems for storing draft and standard, formatted messages such as, for example, maps, directions, and standard responses; systems for sending standard messages; systems for porting information from messages to other applications; and other message-processing systems.

Figure 6:
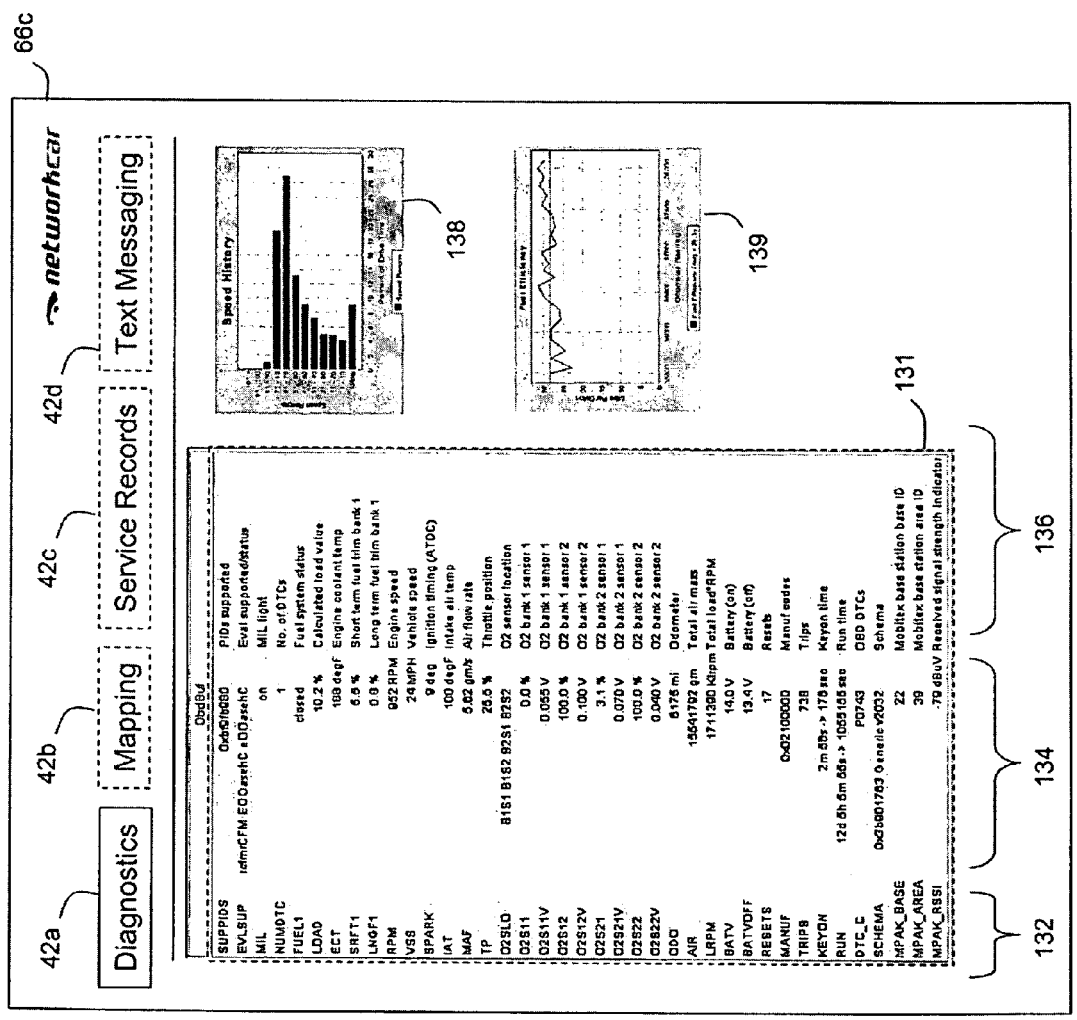
FIG. 6 is a schematic drawing of an Internet-accessible web page displaying diagnostic data according to one embodiment of the present invention.

FIG. 6 depicts a web page 66c that renders when a user selects the "Diagnostics" tab 42a on the web page 66a shown in FIG. 5A. In one embodiment, the web page 66c may display diagnostic data collected from the ECU of a particular vehicle as described above. The web page 66c may also involve a set of diagnostic data 131 that includes fields listing an acronym 132, value and units 134, and a brief description 136 for each datum. In other embodiments, the web page 66c may include graphs 138, 139 that plot selected diagnostic data 131 in time-dependent (graph 139) and histogram (graph 138) formats.

In one embodiment, the in-vehicle telematics device may automatically transmit a set of diagnostic data 131 at a periodic interval such as, every 20 to 40 minutes. In other embodiments, the telematics device may transmit similar data sets at random time intervals in response to a query from the secondary software system, sometimes referred to as a "ping." Detailed descriptions of these data and how such data can be further analyzed and displayed are provided in the following U.S. patents, the contents of which are incorporated herein by reference: WIRELESS DIAGNOSTIC SYSTEM AND METHOD FOR MONITORING VEHICLES (U.S. Pat. No. 6,636,790) and INTERNET-BASED VEHICLE-DIAGNOSTIC SYSTEM (U.S. Pat. No. 6,611,740).

Figure 7:
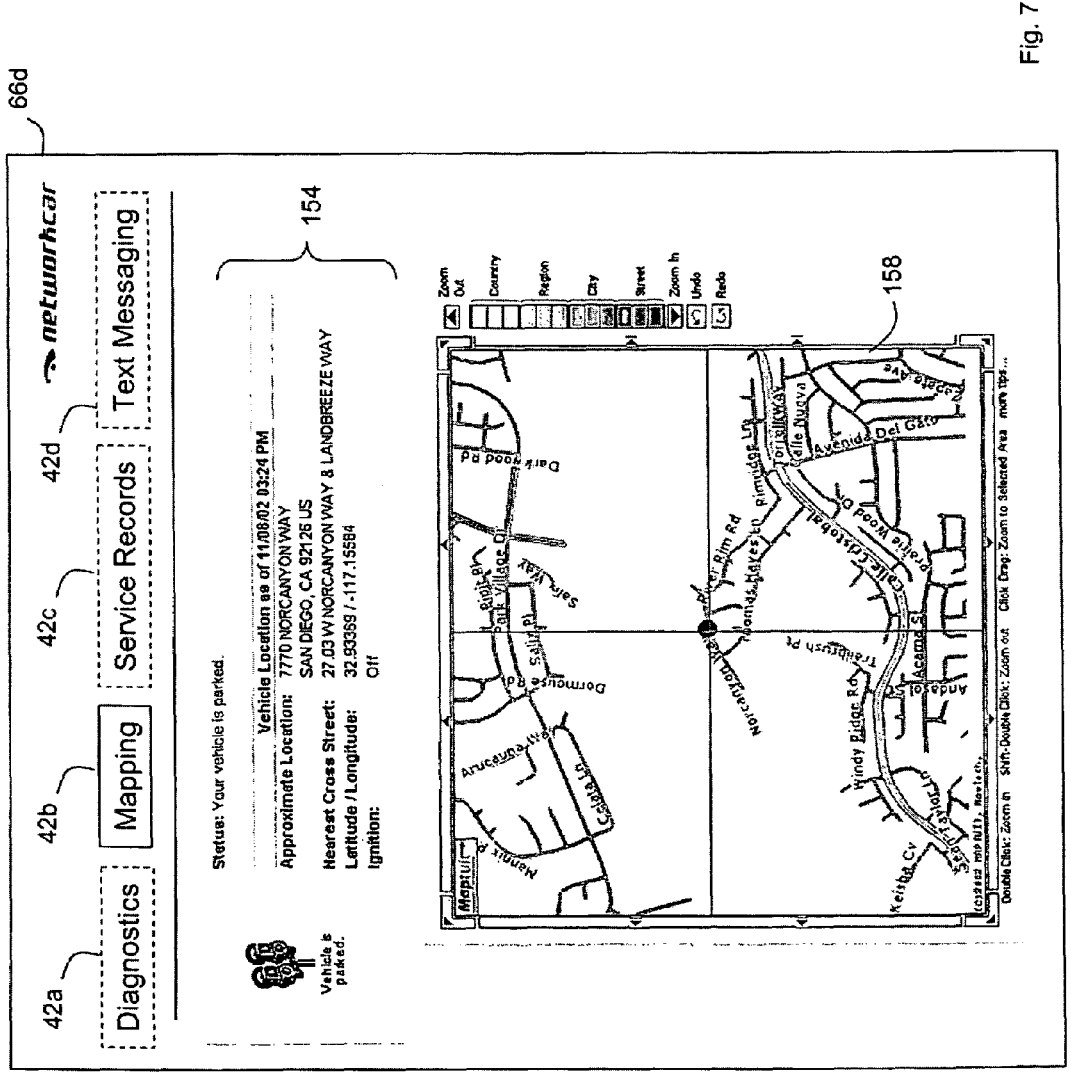
FIG. 7 is a schematic drawing of an Internet-accessible web page displaying location-based data according to one embodiment of the present invention.

FIG. 7 illustrates a web page 66d, according to one embodiment, that renders when a user selects the "Mapping" tab 42b on the web page 66a shown in FIG. 5A. In one embodiment, the web page 66d may display, GPS data 154 and a map 158 that together indicate a vehicle's location. According to this embodiment, the GPS data 154 may include the time and date, the vehicle's latitude, longitude, a "reverse geocode" of these data indicating a corresponding street address, the nearest cross street, and the status of the vehicle's ignition such as, for example, "on" or "off" and whether the vehicle is parked or moving. In addition, the map 158 may display these coordinates in a graphical form relative to an area of a few square miles. In one embodiment, the secondary software system 15 may render the web page 66d each time the GPS data 154 are periodically transmitted from the in-vehicle telematics device 10, for example, every 1-2 minutes.

Both the map 158 and a database that translates the latitude and longitude into a reverse geocode may be hosted by an external computer server and may be accessible though an Internet-based protocol such as XML, Web Services, or TCP/IP. Companies such as MapTuit, MapQuest, and NavTech host software that provides maps and databases such as these. Methods for processing location-based data, taken alone or in combination with diagnostic data, are described in the following U.S. patent application, the contents of which are incorporated herein by reference: WIRELESS, INTERNET- BASED SYSTEM FOR TRANSMITTING AND ANALYZING GPS DATA (U.S. Ser. No. 10/301,010).

FIG. 8 depicts a web page 66e that renders when a user selects the "Service Records" tab 42c on the web page 66a shown in FIG. 5A. In one embodiment, the web page 66e may display a list of service records 164 for a particular vehicle and an individual service record 168 that provides details of a service performed on the vehicle. The list of service records 164 may include: 1) the date of the service; 2) a work order number; and 3) the company providing the service. In addition, the individual service record 168 may describe: 1) the type of service; 2) the mechanic that completed the service; 3) the cost of the service; 4) the mileage on the vehicle at the time of the service; and 5) one or more comments describing the service.

To display the list of service records 164 or the individual service record 168, the secondary software system may communicate through the web services interface to a data-management system ("DMS") that operates in conjunction with a computer system at an automotive dealership. In another embodiment, the DMS may be, for example, an "Entity Relationship Attribute" (ERA) software system. According to this embodiment, the ERA system may transfer service records to the secondary software system through a variety of means such as, for example, XML, XML-based Web Services, file transfer protocol (FTP), and email. In one embodiment, the web page 66e may also include service records describing service performed by organizations other than an automotive dealership. These include services performed by the vehicle owner or another non-dealership entities such as, for example, Jiffy Lube™. In other embodiments, the service records may also be entered by hand into the web page 66e.

In still other embodiments, the above-described telematics system may communicate with a wide variety of secondary software systems via the web services interface. These secondary software systems may, for example, include systems that analyze diagnostic and location-based data, alone or in combination, for: (1) stolen-vehicle recovery; (2) vehicle-manufacturers (e.g., Ford, GM); (3) insurance applications; (4) emissions-control applications; (5) general fleet-management applications; (6) roadside assistance; (7) concierge services (e.g., directions); (8) product development and testing; (9) mapping applications; (10) toll collections; and (11) traffic management.

In further embodiments, the secondary software system may utilize the web services interface to implement additional performance features for the in-vehicle telematics device, for example, (1) alteration of data-transmission rates; (2) firmware downloads; (3) immediate transmission of diagnostic or location-based data; (4) investigation of the in-vehicle unit's hardware or software status; (5) network properties; (6) vehicle performance statistics; (7) GPS properties; and (8) ECU diagnostics and other vehicle properties.

According to other embodiments, the web services interface may feature a suite of "loosely coupled" web services that are "message" based and/or asynchronous in nature. In this embodiment, the loosely coupled web service may replace the above-described systems using the RPC SOAP servlet module as described in FIG. 2. In one embodiment, the loosely coupled web service may permit a "conversation" to occur between the secondary software system and a software system involving the web services interface. For example, the loosely coupled web service may send a first message to the vehicle that causes the in-vehicle telematics device to unlock the doors of the vehicle. According to this embodiment, the first message may also be followed by a second message that requests the in-vehicle telematics device to provide a status report with respect to the operation of unlocking the doors.

In one embodiment, the web services interface may also include security measures such as, for example, authentication, authorization, encryption, credential presentation, and digital signature resolution. In other embodiments, the web services interface may be modified to conform to industry-mandated, XML schema definitions, while remaining "backwards compatible" with any existing XML schema definitions such as XML schema definitions that may be used by an ERP system. In still other embodiments, the web services interface may be designed to be interoperable with other web services implementations, such as, for example, Microsoft .Net and IBM Websphere.

According to further embodiments, web pages hosted by the secondary software system may take on many different forms. For example, the display of the data, the nature and format of the data, and the computer code used to generate the web page and/or data may incorporate a variety of formats without deviating from the spirit of the present invention. In addition, a web page may also be formatted using standard wireless access protocols (WAP) thereby enabling the web page to be accessed by wireless devices such as, for example, cellular telephones, personal digital assistants (PDAs), and other related devices. In addition, these wireless devices may also display text messages that are transmitted using the above-described systems. In still other embodiments, the above-described systems may be used to locate vehicles or items other than cars and trucks, such as, for example, industrial equipment and/or shipping containers.

In general, it will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention. For example, the embodiments described hereinabove may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that some process aspects described herein may be performed using instructions stored on a computer-readable medium or media that direct a computer system to perform the process aspects. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further include one or more data signals transmitted on one or more carrier waves.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

While several embodiments of the invention have been described, it should be apparent, however, that various modifications, alterations and adaptations to those embodiments may occur to persons skilled in the art with the attainment of some or all of the advantages of the present invention. For example, in some embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention. The disclosed embodiments are therefore intended to include all such modifications, alterations and adaptations without departing from the scope and spirit of the present invention as defined by the appended claims.

What is claimed is:

1. A telematics system comprising:
   a web services interface in communication with a secondary system, wherein the web services interface comprises at least one processor configured to at least one of retrieve, receive, analyze and transmit data in response to a request from the secondary system, wherein the at least one processor is configured to:
      process at least one servlet module stored thereon to at least one of:
         receive a first message sent through the web services interface from the secondary system;
         process the first message;
         extract at least one parameter from the first message; and
         transmit the at least one parameter to at least one enterprise Java bean; and
      process the at least one enterprise Java bean to communicate with at least one of the database and a web services description language file, wherein the at least one enterprise Java bean, which when executed by the processor, causes the processor to at least one of:
         extract data from the database;
         transmit data to the database;
         process the web services description language file;
         transmit at least one parameter of the web services description language file to the at least one servlet module; and
         transmit data extracted from the database to the at least one servlet module;
   a gateway system configured to at least one of transmit data through a network to an in-vehicle telematics device and receive data from an in-vehicle telematics device, wherein the data comprises at least one of diagnostic data and location-based data associated with a host vehicle; and
   a database in communication with the gateway system and the web services interface, wherein the database is configured to receive and store data from at least one of the gateway system and the web services interface.

2. The telematics system of claim 1, wherein the at least one servlet module, which when executed by the processor, causes the processor to transmit a second message to the secondary system.

3. The telematics system of claim 2, wherein the at least one enterprise Java bean is a stateless session bean.

4. The telematics system of claim 1, wherein the web services interface is configured to transmit at least one of the diagnostic data and the location-based data to the secondary system.

5. The telematics system of claim 4, wherein the web services interface is configured to transmit to the secondary system an Extensible Markup Language message, wherein the Extensible Markup Language message comprises at least one of the diagnostic data and location-based data.

6. The telematics system of claim 4, wherein the web services interface is configured to transmit to the secondary system a simple object access protocol message, wherein the simple object access protocol message comprises at least one of the diagnostic data and location-based data.

7. The telematics system of claim 1, wherein derivatives of at least one of the diagnostic data and the location-based data are at least one of stored, retrieved, received, analyzed and transmitted.

8. The telematics system of claim 1, wherein the web services interface is configured to process at least one message, wherein the message is coded in an application-independent format.

9. The telematics system of claim 8, wherein the application-independent format is an Extensible Markup Language format.

10. The telematics system of claim 8, wherein the application-independent format is a simple object access protocol format.

* * * * *